Patented Apr. 25, 1933

1,905,087

UNITED STATES PATENT OFFICE

MAX GOEBEL, OF TERRE HAUTE, INDIANA, ASSIGNOR TO COMMERCIAL SOLVENTS CORPORATION, OF TERRE HAUTE, INDIANA, A CORPORATION OF MARYLAND

REACTIVATION OF SPENT FILTER MATERIALS

No Drawing. Application filed June 19, 1930. Serial No. 462,426.

My invention relates to the revivification of filtering or decolorizing agents such as fuller's earth, kieselguhr, bauxite, charcoal, and the like, and especially decolorizing clays of the type used in the petroleum industry.

Various types of fuller's earth, other siliceous bodies such as hydrous magnesium silicates, etc. have been employed for the decolorization of oils, both mineral and vegetable, of waxes such as ceresin, Montan wax, etc., and of other liquids or materials readily rendered liquid. These clays are relatively expensive, and especially in the petroleum industry are used in very great quantities. The clays, in a finely divided form, are used in bulk for treating or filtering the hot oils to remove colored impurities by adsorption. After a single use, the clays are found to have lost a large proportion of their adsorbent power, and the restoration of this power has long been a problem in the industry, since only a single use of an expensive clay involves a considerable item in the cost of refining.

In the past a number of processes have been recommended for the revivification of these clays, but none has met with any degree of success. The only process to come into practice is that of burning the clay. This method gives very poor reactivation, and is uneconomical, due to dust losses, sintering, fusing, and other losses. The use of various solvents or solvent mixtures has met with even less success. Such materials as pine oil and soap solutions have been recommended as well as mixtures of the more common organic solvents.

Various organic solvents and mixtures of solvents have been suggested by Parsons, Robinson, Chappell, Manning, Prutzman, and others. However, the processes suggested by these investigators involved the use of solvent mixtures at ordinary temperatures or the use of a single solvent under greatly increased temperatures and pressures, and, as pointed out above, none of these processes have proved satisfactory in actual practice.

I have now found that greatly improved results over those mentioned above may be obtained by using a solvent mixture containing an alcohol, a ketonic body, an aromatic hydrocarbon, and a diluent comprising a low-boiling petroleum fraction. These improved results were entirely unanticipated in view of the above-mentioned art since the reactivation obtained by the use of my solvent is greatly in excess of the purely additive results of the mixtures disclosed in the prior art.

As suitable alcohols, methyl, ethyl, propyl, isopropyl, butyl, and amyl alcohols are suitable, but slightly better results are obtained with methyl alcohol, and I prefer this alcohol also in view of price considerations, purity of the commercial product, and greater ease of solvent recovery. Ketonic bodies such as acetone, methyl-ethyl ketone, diethyl ketone, ethyl-propyl ketone, diacetone alcohol, and the like may be employed. Of these I prefer to use acetone. As aromatic hydrocarbons, such compounds as benzol, toluol, etc. are satisfactory, but I have found benzol to be preferable. As a diluent, such petroleum fractions as petroleum ether, casing-head gasoline, gasoline naphtha, gasoline, and kerosene are satisfactory, but I prefer to use naphtha or gasoline.

The mechanics of the revivification by such a solvent mixture are unknown, but apparently the alcohol, ketone, and aromatic hydrocarbon serve as solvents for the coloring matter. The diluent apparently serves in a physical capacity, to improve contact of the solvents with the clay, and to yield a mixture with the clay which is not too viscous for efficient operation. Of course the diluent also serves to cheapen the solvent mixture, which is an added advantage to be gained without an apparent loss in efficiency. If the clay has not been previously subjected to an extraction of the soakage oil, the diluent will also serve as a solvent for this oil, but this is of secondary importance, its primary function being to aid in the revivification.

The following data will show the improved results to be gained by the use of my solvent mixtures over others recommended in the past. In each of these cases naphtha was employed as the diluent, and 60 c. c. of the total solvent mixture were employed for 20 gm. of clay. The per cent reactivation was determined by simple proportion of the colorimetric value of oil treated with the revivified clay as compared to that treated with spent clay and fresh clay.

| Solvent mixture | Temp. | Color intensity of treated oil | Per cent reactivation |
|---|---|---|---|
| Acetone—1 part<br>Benzol—1 part<br>Naphtha—2 parts | 20° C. | 2.25 | 60 |
| Methanol—1 part<br>Benzol—1 part<br>Naphtha—2 parts | 20° C. | 1.9 | 70 |
| Methanol—1 part<br>Acetone—1 part<br>Benzol—1 part<br>Naphtha—3 parts | 20° C. | 1.5 | 85 |
| Fresh clay | 20° C. | 1.0 | 100 |
| Spent clay | 20° C. | 4.0 | 0 |

I have further found that greatly improved results may be obtained by carrying out the revivification at temperatures considerably above atmospheric. All previous processes for reactivation have been carried out at substantially atmospheric temperatures with the exception of the process of Prutzman, who mentions that gentle heating may be employed. I have found, however, that gentle heating is insufficient to give rise to improved results, and I prefer to carry out my process at the boiling point of the solvent mixture. Of course, temperatures somewhat above or below the boiling point may be employed, but for convenience and efficient operation I prefer to reflux the clay with the solvent mixture. In this way pressure apparatus is not necessary, and more efficient reactivation is obtained than by using temperatures below the boiling point. Further, by refluxing the mixture, agitation is secured which in most cases obviates the necessity of mechanical agitation.

That improved results are obtained at temperatures higher than atmospheric or those obtained by gentle heating is borne out by a consideration of known adsorption isobars and isosteres, which show that at temperatures about 0° C. a considerable increase in temperature is necessary to cause a substantial diminution in adsorptive power. The improved results obtained in my process are, however, not predictable from a mere consideration of these adsorption curves, since a greater removal of adsorbed or occluded material is realized at the boiling point of the solvent than could be anticipated from a calculation based on a constant value of "zeta $t$", (which value would be nearly constant within the limits of temperature under consideration). Other unknown factors appear to be involved. For example, I have found that the addition of acid to the solvent mixtures, as recommended by Chappell, et al., increases the reactivation at the low temperatures of the old processes for which the mixtures were devised, but that when employing my process at the boiling point of the solvent mixture, the addition of acid has no beneficial effect, and in many cases is actually detrimental. However, I have found that the use of high temperatures gives greatly improved results with most organic solvent mixtures, and especially with my preferred mixtures.

The following data will show the increased revivification to be obtained at the boiling point of the solvent mixtures:

| Solvent mixture | Temp. | Color intensity of treated oil | Per cent reactivation |
|---|---|---|---|
| Acetone—1 part<br>Benzol—1 part<br>Naphtha—2 parts | 20° C. | 2.25 | 60 |
| Acetone—1 part<br>Benzol—1 part<br>Naphtha—2 parts | B. P. | 1.1 | 95 |
| Acetone—1 part<br>Methanol—1 part<br>Benzol—1 part<br>Naphtha—3 parts | 20° C. | 1.5 | 85 |
| Acetone—1 part<br>Methanol—1 part<br>Benzol—1 part<br>Naphtha—3 parts | B. P. | 0.9 | 105 |
| Fresh clay | B. P. | 1.0 | 100 |
| Spent clay | B. P. | 4.0 | 0 |

The method of carrying my process into effect may best be illustrated by the following example:

A charge of 1500 lbs. of spent clay, 100 gals. acetone, 100 gals. methanol, 100 gals. benzol, and 300 gals. naphtha is placed in a kettle equipped with an efficient reflux condenser. The temperature is gradually raised until vigorous refluxing commences, and the reflux is continued for 1 hr. The solvent extract is then drawn off, and 300 gals. of naphtha added to remove the remainder of the solvent. The naphtha is then drawn off, and the last traces removed by steam distillation. The naphtha may be used in making up the next batch of solvent mixture, if desired. The clay may then be dried, or may be used for the decolorization of a fresh batch of oil while still in a mudded condition. The solvents are recovered by distillation from the solvent extract, and may then be used for further revivification. If the spent clay has not been previously extracted with naphtha or another oil solvent to remove the soakage oil, this will be found in the residue of the solvent extract after recovery of the solvents. This oil may be acid-treated and added to a fresh batch of crude oil; or, if an asphalt-crude is being employed it may be added directly to the crude oil since it will receive the acid-treatment in the process.

Of course, the above procedure may be varied in a number of ways without departing from the spirit of my invention. For example, the time of refluxing will depend upon the size of the batch, the amount of coloring matter in the clay, and other factors. I have found, however, that in general 15 min. to 2 hrs. is sufficient for this purpose. The separation of the solvent extract from the clay may be accomplished by any of the known means such as filtration, centrifuging, decanting, blowing, etc. The naphtha wash is not essential to the process, but I have found that it is preferable to use it both from the standpoint of solvent recovery, and of efficient reactivation. The naphtha may be removed by any of the known means such as direct distillation, steam distillation, blowing, etc.

While I have found that in most cases a single extraction is sufficient to fully reactivate the clay, if found necessary or desirable, repeated or continuous extraction could be resorted to. The counter-current principle could be applied by operating in a cycle with a battery of extractors. In that case the solvent mixture, when cooled sufficiently for transfer, would be passed to the succeeding kettle containing less-extracted clay, and by utilizing the necessary number of kettles and a correctly synchronized cycle, a counter-current extraction using a boiling solvent mixture could easily be made.

The amount of solvent mixture to be used per lb. of clay will, of course, depend upon the size of the particles, the amount of oil or coloring matter in the clay, and generally upon its tendency to form a thick mud rather than a slurry of more desirable consistency for extraction. In general, I have found the lower limit of solvent mixture of clay to be about 1 gal. of solvents to 2 lbs. of clay. The upper limit will of course be fixed by price considerations.

I have found that the exact proportions of the ingredients of the solvent mixture are not of great importance, so long as the compound of each of the types specified is present in a substantial amount, say 5 or 10% of the total. When the ratio of total solvent mixture to clay has been chosen on the basis of mechanical operating efficiency, the proportion of diluent which may be employed will be fixed by the amounts of coloring matter in the clay—only sufficient of the more expensive solvents being used to completely reactivate the clay. In general, I prefer to use the diluent in amounts of from 25% to 75% of the total. The mixture used in the example cited above has proved very satisfactory for a number of different clays.

It is to be understood that I do not wish my invention to be limited to any of the specific substances or amounts cited in the examples or tables.

What I claim is:

1. A process for the revivification of spent decolorizing agents which comprises extracting with a solvent mixture comprising an alcohol, a ketonic body, an aromatic hydrocarbon, and a diluent comprising a low-boiling petroleum fraction.

2. A process for the revivification of spent decolorizing agents which comprises extracting with a solvent mixture comprising an aliphatic alcohol, a ketone, benzol, and a diluent comprising a low-boiling petroleum fraction.

3. A process for the revivification of spent decolorizing agents which comprises extracting with a solvent mixture comprising an alcohol, a ketonic body, an aromatic hydrocarbon, and at least 25% of a diluent comprising a low-boiling petroleum fraction.

4. A process for the revivification of spent decolorizing agents which comprises extracting with a solvent mixture comprising methanol, acetone, benzol and naphtha.

5. A process for the revivification of spent decolorizing agents which comprises extracting with a solvent mixture comprising methanol, acetone, benzol, and at least 25% of a diluent comprising a low-boiling petroleum fraction.

6. A process for the revivification of spent decolorizing agents which comprises extracting with a boiling solvent mixture comprising an alcohol, a ketonic body, an aromatic hydrocarbon, and a diluent comprising a low-boiling petroleum fraction.

7. A process for the revivification of spent decolorizing agents which comprises refluxing with a solvent mixture comprising an alcohol, a ketonic body, an aromatic hydrocarbon, and a diluent comprising a low-boiling petroleum fraction.

8. A process for the revivification of spent decolorizing agents which comprises refluxing for from 15 min. to 2 hrs. with a solvent mixture comprising an alcohol, a ketonic body, an aromatic hydrocarbon, and a diluent comprising a low-boiling petroleum fraction.

9. A process for the revivification of spent decolorizing agents which comprises refluxing with a solvent mixture comprising an aliphatic alcohol, a ketone, benzol, and at least 25% of a diluent comprising a low-boiling petroleum fraction.

10. A process for the revivification of spent decolorizing agents which comprises refluxing with a solvent mixture comprising methanol, acetone, benzol, and at least 25% of a diluent comprising a low-boiling petroleum fraction.

11. A process for the revivification of spent decolorizing agents which comprises refluxing with a solvent mixture comprising one part methanol, one part acetone, one part benzol, and three parts naphtha.

In testimony whereof I affix my signature.
MAX GOEBEL.